UNITED STATES PATENT OFFICE.

AUGUST CHRISTIAN ESCHENBACH AND LEO SIELKE, OF NEW YORK, N. Y., ASSIGNORS OF ONE-FOURTH TO LOUIS RHEINISH, OF SAME PLACE.

LABELING COMPOSITION.

SPECIFICATION forming part of Letters Patent No. 615,613, dated December 6, 1898.

Application filed January 31, 1898. Serial No. 668,640. (No specimens.)

*To all whom it may concern:*

Be it known that we, AUGUST CHRISTIAN ESCHENBACH, a subject of the Emperor of Germany, and LEO SIELKE, a citizen of the United States, residing at New York, in the county of New York and State of New York, have invented a certain new and useful Composition for Labeling Cigars and Process of Producing the Same, of which the following is a full and complete specification, such as will enable those skilled in the art to which it appertains to make and use the same.

This invention relates to an improved composition for use in printing directly upon or labeling cigars and to the method or process of producing the same, whereby no deterioration in the flavor or quality of the cigar will result and whereby erasure of the printing or labeling is precluded.

In carrying out our invention we first produce a new compound or composition embodying an abstract of tobacco, which we term "nicotrin," and which consists of the following ingredients and relative proportions: water, (distilled,) twenty parts; glycerin, (purified by the extraction of saccharine matter,) six parts; tobacco, one part; alcohol, (ethyl, ninety-five per cent. test,) eighty parts.

In producing the above nicotrin composition or essence the tobacco, which may be of different flavors, is first placed in a glass jar or other suitable vessel adapted to be closed or corked. The water is then poured on the tobacco at a temperature of approximately 50° Fahrenheit. The action of the water opens the pores of the tobacco. The glycerin is now added, the office of the glycerin being to serve as a binder or adhesive element between the water and tobacco and the alcohol. The alcohol is now gradually added to the whole mass, and the latter is then raised gradually to the temperature of 160° Fahrenheit, during which process the gases forming in the jar are permitted to escape. After a period of from twenty to forty minutes the action is perfected. In the first stage the color of the mass is of a green shade, after which it assumes a brown-green tint, and finally assumes a darker shade. The jar or vessel is then corked or sealed and permitted to gradually cool again to the initial temperature of 50° Fahrenheit. The above-described composition or extract thus embodies the flavor of tobacco united with alcohol, and the relative proportional parts above specified are by weight.

The composition is, after straining, intermixed in equal parts with shellac, and the resulting compound produces a fluid or liquid to be used in printing directly upon cigars. It will be understood that the shellac employed consists of vegetable gum combined with alcohol, and in the mixture of the composition with the shellac the former flavors the gum in the shellac and imparts to said gum the flavor or quality of tobacco, while in use the volatile elements of the alcohol will evaporate and leave a coating which is odorless, which coating, in combination with the shellac gum, produces the adhesive power of the composition by which it is permanently set upon the tobacco of the cigar.

The above-described printing liquid can be colored, as desired, with any suitable earthen pigment, but chemicals are not to be employed for this purpose. The liquid can also be used as a size for leaf gold, silver, &c. In this use of the liquid as a size the glycerin will serve for the further office of retaining the liquid when applied for printing in a gummy or sticky condition for a sufficiently long time to enable the convenient application of the leaf-gold or the like.

Our improved composition is designed to be used for printing directly upon cigars by means of hand-stamps or in any other suitable or adapted manner, so that any desired wording, labels, or trade-marks can be conveniently and effectively printed directly upon a cigar. The cigars thus treated can be immediately packed without injuring the printing, and the latter is proof against moisture and cannot be washed off with water or any other substance which is non-injurious to the tobacco. It will not chip or crack and its residue, after burning, produces a coating standing upon the ashes of the cigar. It will be understood that this printing liquid does not in any way affect the flavor or quality of the cigar and that its presence upon the latter cannot be detected in smoking.

Having fully described our invention, we claim as new and desire to secure by Letters Patent—

1. The composition for printing directly upon cigars and tobacco, consisting of an extract of tobacco and alcohol, combined with shellac, in substantially the manner and proportions set forth.

2. The composition for printing directly upon cigars and tobacco, consisting of an extract of tobacco, alcohol, and glycerin, combined with shellac, in substantially the manner and proportions set forth.

3. The composition for printing directly upon cigars and tobacco, consisting of tobacco, water, glycerin, and alcohol, combined with shellac, in substantially the manner and proportions set forth.

4. The composition for printing directly upon cigars and tobacco, comprising an extract of tobacco, alcohol, and glycerin, combined in substantially the manner and proportions set forth.

5. The composition for printing directly upon cigars and tobacco, consisting of an extract of tobacco combined with a gum or adhesive substance, substantially as set forth.

6. The process of producing a composition for use in printing directly upon cigars and tobacco, consisting in placing tobacco in a suitable vessel, opening the pores of the same by the addition of water at a temperature of approximately 50°, adding an adhesive element, such as glycerin, then combining alcohol with the mass, gradually raising the temperature of the combined mass to approximately 160°, and then gradually cooling the mass to its initial temperature of approximately 50°, and mixing shellac therewith substantially as and for the purpose set forth.

In testimony that we claim the foregoing as our invention we have signed our names, in presence of the subscribing witnesses, this 28th day of January, 1898.

AUGUST CHRISTIAN ESCHENBACH.
LEO SIELKE.

Witnesses:
L. M. MULLER,
M. A. KNOWLES.